(12) United States Patent
Oh et al.

(10) Patent No.: US 9,180,918 B2
(45) Date of Patent: Nov. 10, 2015

(54) CAB TILTING DEVICE (71) Applicant: Hyundai Motor Company, Seoul (KR)

(72) Inventors: Seunghyun Oh, Whasung-Si (KR);
Byungbae Kim, Whasung-Si (KR);
Dong Geun Lee, Whasung-Si (KR); Dae
Su Kim, Whasung-Si (KR)

(73) Assignee: HYUNDAI MOTOR COMPANY,
Seoul (KR)

( * ) Notice: Subject to any disclaimer, the term of this patent is extended or adjusted under 35 U.S.C. 154(b) by 55 days.

(21) Appl. No.: 14/098,515

(22) Filed: Dec. 5, 2013

(65) Prior Publication Data
US 2014/0367995 A1 Dec. 18, 2014

(30) Foreign Application Priority Data
Jun. 12, 2013 (KR) .......................... 10-2013-0067343

(51) Int. Cl.
B62D 33/067 (2006.01)
B62D 33/07 (2006.01)

(52) U.S. Cl.
CPC .............. *B62D 33/067* (2013.01); *B62D 33/07* (2013.01)

(58) Field of Classification Search
CPC ............................... B62D 33/067; B62D 33/07

USPC ...................... 296/190.06, 190.04; 180/89.14
See application file for complete search history.

(56) References Cited

U.S. PATENT DOCUMENTS

| 5,967,597 A * | 10/1999 | Vander Kooi et al. ... 296/190.07 |
| 6,283,463 B1 * | 9/2001 | Park .............................. 267/273 |
| 6,530,586 B2 * | 3/2003 | Fader et al. ............ 280/124.106 |

FOREIGN PATENT DOCUMENTS

| JP | 6-8858 A | 1/1994 |
| JP | 4104441 B2 | 7/2004 |
| JP | 2012-11966 A | 1/2012 |
| KR | 1998-035731 U | 9/1998 |
| KR | 10-2005-0119334 A | 12/2005 |
| KR | 10-0747268 B1 | 4/2007 |

* cited by examiner

Primary Examiner — Joseph D Pape
Assistant Examiner — Dana Ivey
(74) Attorney, Agent, or Firm — Morgan, Lewis & Bockius LLP (57) ABSTRACT A cab tilting device includes: a left torsion bar connected with the left bottom of a cab of a vehicle to generate twisting restoring force to tilt the cab toward the front of the vehicle from the left bottom of the cab in a width direction of the cab; and a right torsion bar connected with the right bottom of the cab to generate the twisting restoring force to tilt the cab toward the front of the vehicle from the right bottom of the cab in the width direction of the cab to generate the same twisting tilting force from the left side to the right side of the cab.

11 Claims, 8 Drawing Sheets

CAB TILTING DEVICE

CROSS-REFERENCE TO RELATED APPLICATION

The present application claims priority of Korean Patent Application Number 10-2013-0067343 filed Jun. 12, 2013, the entire contents of which application is incorporated herein for all purposes by this reference.

BACKGROUND OF INVENTION

1. Field of Invention

The present invention relates to a cab tilting device that tilts a front of a cab of a commercial vehicle such as a truck to a vehicle body at a predetermined angle.

2. Description of Related Art

In general, a cab provided for a driver to ride in a heavy-duty truck such as a baggage vehicle, or the like is mounted to be tilted to a vehicle body toward the front of a vehicle at a predetermined angle to allow various devices such as an engine or a transmission installed in the vehicle body below the cab to be maintained or checked.

The aforementioned conventional cab tilting device is divided into an electric hydraulic cab tilting device or mechanical cab tilting device, and the mechanical cab tilting device uses a torsion bar to generate tilting force of the cab.

That is, the conventional mechanical cab tilting device using the torsion bar includes a torsion bar that extends in a width direction of the vehicle rotatably mounted on the vehicle body, a tilting arm of which one end is connected to the torsion bar and the other end is connected to the cab to transfer twisting restoring force of the torsion bar to the cab, and a tilting stay of which one end is connected to the vehicle body and the other end is connected to the cab in order to selectively keep a state in which the cab is tilted toward the front of the vehicle at a predetermined angle.

In a cab tilting system by uniaxial twisting stiffness using one torsion bar in the conventional cab tilting device, when the cab is twisted to a front left side or a front right side to the vehicle body, twisting force which is laterally asymmetric is generated even in the torsion bar.

Further, a structure to mount the torsion bar on the vehicle body is complicated and a mounting structure is different depending on a cab type and a hinge cushion and the torsion bar for mounting the torsion bar on the vehicle body are integrated, and as a result, it is disadvantageous in ride comfort.

In addition, in the conventional cab tilting device, since the tilting stay is positioned on a front lower end of a vehicle by a structural reason, the cab is tilted toward the front of the vehicle and thereafter, a worker needs to perform a tilting stay work of the cab while bending his/her back, and as a result, the tilting stay work is inconvenient and a safety accident may occur.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a cab tilting device that can improve ride comfort, operability, and workability, and reduce a weight and operating noise.

Various aspects of the present invention provide for a cab tilting device, including: a left torsion bar connected with the left bottom of a cab to generate twisting restoring force to tilt the cab toward the front of the vehicle from the left bottom of the cab in a width direction of the cab; and a right torsion bar connected with the right bottom of the cab to generate the twisting restoring force to tilt the cab toward the front of the vehicle from the right bottom of the cab in the width direction of the cab.

The left torsion bar and the right torsion bar may extend in the width direction of the cab.

The left torsion bar and the right torsion bar may be disposed to cross each other in the width direction and the height direction of the cab.

Predetermined spots of the left torsion bar and the right torsion bar in the longitudinal direction thereof may be rotatably supported on a vehicle body, and one end of each bar may be fixedly mounted on the vehicle body and the other end of each bar may be connected to the cab.

A left vehicle body mounting bracket and a right vehicle body mounting bracket may be mounted on the left and right sides of the vehicle body in the width direction of the vehicle, respectively, the left torsion bar may fit through the left vehicle body mounting bracket to be supported and be fixedly mounted on the right vehicle body mounting bracket, and the right torsion bar may fit through the right vehicle body mounting bracket to be supported and be fixedly mounted on the left vehicle body mounting bracket.

A bush through which the left torsion bar fits to be supported and a fixing bracket coupled with the right torsion bar may be each mounted on the left vehicle body mounting bracket, and a bush through which the right torsion bar fits to be supported and a fixing bracket coupled with the left torsion bar may be each mounted on the right vehicle body mounting bracket.

The fixing bracket may include quadrangular coupling holes in which front ends of the left torsion bar and the right torsion bar fit, and mounting holes for mounting the left torsion bar and the right torsion bar on the vehicle body mounting bracket, and the front ends of the left torsion bar and the right torsion bar may be formed in a quadrangular coupling projection shape to correspond to a quadrangular shape of the coupling hole.

Each of the left torsion bar and the right torsion bar may be formed in a 'L' shape.

Each of the left torsion bar and the right torsion bar may include a first bend bent at a predetermined spot in the longitudinal direction of the bar at a predetermined angle, a torsion part that extends in the width direction of the vehicle based on the first bend to generate twisting restoring force, and an arm part that extends in the longitudinal direction of the vehicle based on the bend connected to the cab.

Each of the left torsion bar and the right torsion bar may include one end fixed to the vehicle body, and the other end connected to the cab, and a second bend may be formed at a torsion part of each of the left torsion bar and the right torsion bar so that the one end makes an acute angle with the first bend toward the front of the vehicle.

The second bend may be bent upward in the height direction of the vehicle so that the left torsion bar has a 3D shape, and the second bend may be bent downward in the height direction of the vehicle so that the right torsion bar also has the 3D shape.

The other end of each of the left torsion bar and the right torsion bar may be connected to one end of a connection link, a cab mounting bracket may be fixedly mounted on the cab, the other end of the connection link may be connected to the cab mounting bracket, and a stay for suspending and fixing the cab mounting bracket may be installed in the connection link.

A suspension pin may be installed in the cab mounting bracket, and the stay may include a hook which is detachably coupled to the suspension pin and an operating handle integrally connected to the hook in order to rotate the hook so that the hook is separated from the suspension pin.

The bush may be installed at a spot where the cab mounting bracket and the connection link are connected to each other.

The bush may be installed at a connection spot between each of the left torsion bar and the right torsion bar, and the connection link.

According to various aspects of the present invention, since a cab tilting device can generate the same twisting restoring force at a left lower side and a right lower side of a cab by using a pair torsion bars, the cab tilting device can resolve twisting of the cab and the cab tilting device can be commonly applied depending on a specification of the cab, and as a result, the cab tilting device can have versatility.

In addition, since a separate mounting cross member for mounting a torsion bar on a vehicle body need not be used, a weight of a vehicle can be reduced and ride comfort can be improved by reducing stiffness of a hinge cushion of the torsion bar.

Further, a stay that stays the cab is positioned at an upper rear portion of the cab, and as a result, accessibility of the stay and worker's workability can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
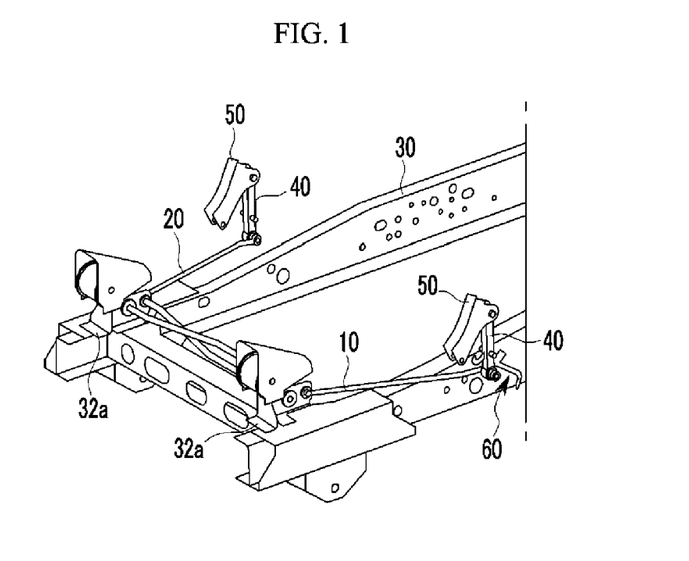
FIG. 1 is a perspective view of a state in which an exemplary cab tilting device is mounted on a vehicle body according to the present invention.

Referring to FIG. 1, a cab tilting device according to various embodiments of the present invention may include a pair of torsion bars that are formed to extend in a width direction of a vehicle.

The one pair of torsion bars may include a left torsion bar 10 generating twisting restoring force at a left side and a right torsion bar 20 generating the twisting restoring force at a right side based on the width direction of the vehicle.

Each of the left torsion bar 10 and the right torsion bar 20 may be supported while being mounted on a vehicle body frame 30 constituting a vehicle body.

A left vehicle body mounting bracket 32a and a right vehicle body mounting bracket 32b that form a pair may be fixedly mounted on both left and right front ends in the width direction of the vehicle of the vehicle body frame 30, the left torsion bar 10 extends through the left vehicle body mounting bracket 32 to fit in the right vehicle body mounting bracket 32b, and the right torsion bar 20 may fit in the left vehicle body mounting bracket 32a through the right vehicle body mounting bracket 32b.

One end of a connection link 40 that extends substantially vertically in a height direction of the vehicle may be coupled to the front end of each of the left torsion bar 10 and the right torsion bar 20 and a cab mounting bracket 50 mounted on a cab (not illustrated) may be coupled to the other end of the connection link 40.

A stay 60 for hooking and fixing the cab mounting bracket 50 may be installed in the connection link 40.

Figure 2:
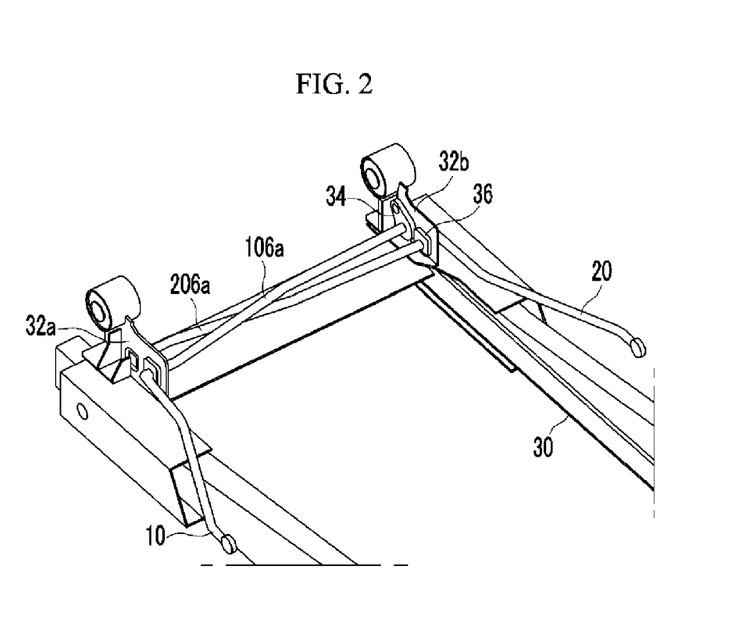
FIG. 2 is a perspective view of a state in which a pair of torsion bars of the cab tilting device of FIG. 1 is mounted on the vehicle body according to the present invention.

Referring to FIG. 2, two assembly holes that penetrate forward and backward in a longitudinal direction of the vehicle may be formed in the left vehicle body mounting bracket 32a and the right vehicle body mounting bracket 32b, respectively and a fixing bracket 34 and a bush 36 may fit in the two assembly holes, respectively.

Figure 3:
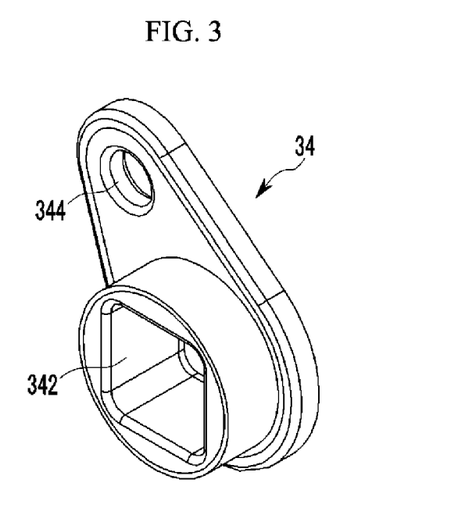
FIG. 3 is a perspective view of an exemplary fixing bracket according to the present invention.

Each of the fixing brackets 34 may include a coupling hole 342 in which the front ends of the left torsion bar 10 and the right torsion bar 20 fit and a mounting hole 344 for mounting the fixing bracket 34 in the vehicle body mounting brackets 32a and 32b with bolts, and the like, as illustrated in FIG. 3.

The coupling hole 342 may have a quadrangular shape to couple the left torsion bar 10 and the right torsion bar 20 so as to prevent the front ends of the left torsion bar 10 and the right torsion bar 20 from fitting and rotating.

Figure 4:
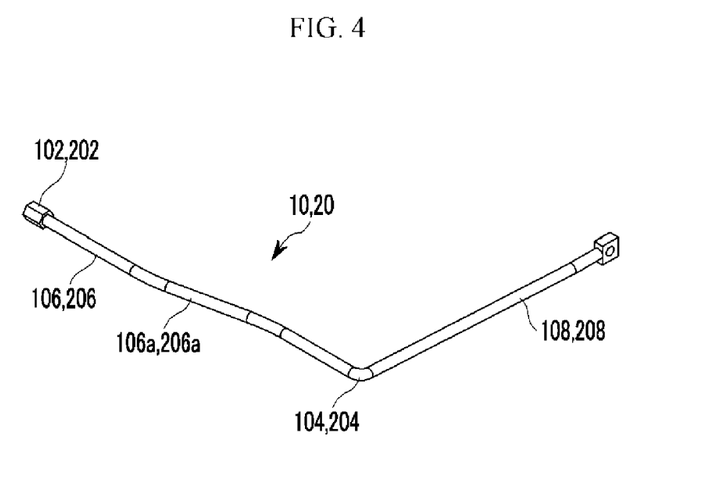
FIG. 4 is a perspective view of an exemplary bush according to the present invention.

Coupled front ends 102 and 202 of the left torsion bar 10 and the right torsion bar 20 may be formed in quadrangular coupled projection shape as illustrated in FIG. 4 to correspond to the quadrangular shape of the coupling hole 342.

Figure 5:
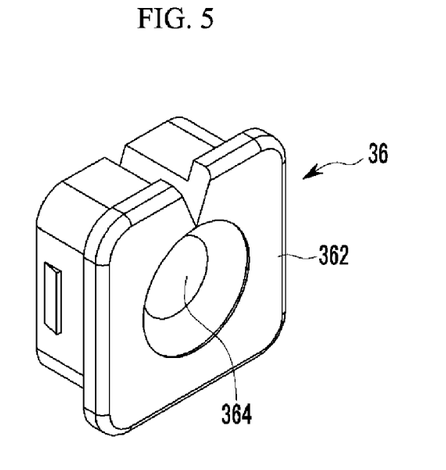
FIG. 5 is a perspective view of an exemplary torsion bar according to the present invention.

The bush 36 may include a rubber-made bush body 362 having a substantially quadrangular block shape, and an assembly hole 364 in which each of the left torsion bar 10 and the right torsion bar 20 fits through the center of the bush body 362, as illustrated in FIG. 5.

Referring to FIG. 4, each of the left torsion bar 10 and the right torsion bar 20 may have a shape in which each torsion bar is bent substantially in a ㄱ shape.

The left torsion bar 10 and the right torsion bar 20 may include torsion parts 106 and 206 that extend in the width direction of the vehicle based on first bends 104 and 204 which are bent at a predetermined region at a predetermined portion in the longitudinal direction to generate twisting restoring force, and arm parts 108 and 208 that extend in the longitudinal direction of the vehicle based on the first bends 104 and 204 connected to the connection link 40.

Second bends 106a and 206a may be formed at predetermined spots of the torsion parts 106 and 206 in the longitudinal direction of the torsion parts 106 and 206 so that the coupled front ends 102 and 202 formed in the torsion parts 106 and 206 make an acute angle with the first bends 104 and 204 toward the front of the vehicle.

Further, the second bend 106a of the left torsion bar 10 is bent upward in the height direction of the vehicle to have a 3D shape and the second bend 206a of the right torsion bar 20 is bent downward in the height direction of the vehicle to have the 3D shape.

The reason why the second bend 106a of the left torsion bar 10 and the second bend 206a of the right torsion bar 20 are formed upward and downward in the height direction of the vehicle, respectively is to prevent the left torsion bar 10 and the right torsion bar 20 from interfering with each other and generate the same twisting restoring force at the left and right sides of the cab.

That is, as illustrated in FIG. 2, while the fixing bracket 34 is assembled to the left vehicle body mounting bracket 32a and the right vehicle body mounting bracket 32b to be positioned toward the front of the bush 36 in the longitudinal direction of the vehicle, when the left torsion bar 10 penetrates the left vehicle body mounting bracket 32a via the bush 36 and thereafter, fits in the fixing bracket 34 of the right vehicle body mounting bracket 32b and the right torsion bar 20 penetrates the right vehicle body mounting bracket 32b via the bush 36 and thereafter, fits in the fixing bracket 34 of the left vehicle body mounting bracket 32a, the left torsion bar 10 and the right torsion bar 20 are disposed to cross in the width direction and the height direction of the vehicle. Therefore, even though the respective torsion bars 10 and 20 are twisted due to the second bend 106a of the left torsion bar 10 and the second bend 206a of the right torsion bar 20 while the left torsion bar 10 and the right torsion bar 20 cross as such, the respective torsion bars 10 and 20 do not interfere with each other the same twisting restoring force may be generated in the left torsion bar 10 and the right torsion bar 20.

Figure 6:
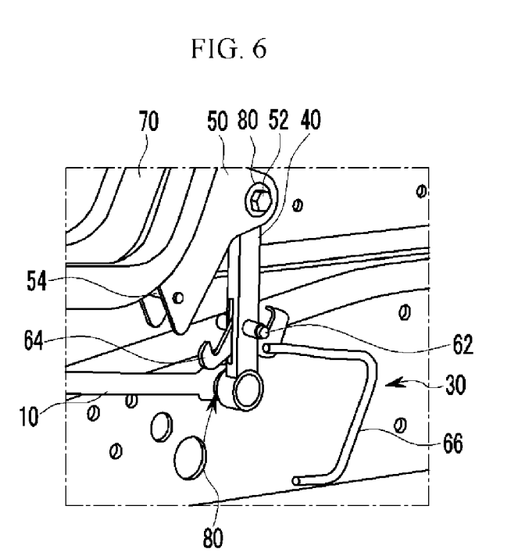
FIG. 6 is a perspective view of a state in which an exemplary stay is installed in a link according to the present invention.

Referring to FIG. 6, the stay 60 may be rotatably mounted on a predetermined portion of the connection link 40 in the longitudinal direction via a hinge pin 62.

Each stay 60 may include a hook 64 rotatably mounted via the hinge pin 62 and an operating handle 66 integrally connected to the hook 64 in order to rotate the hook 64.

The cab mounting bracket 50 may be fixedly mounted on a cab frame 70 constituting the cab.

The cab mounting bracket 50 may engage with one end of the connection link 40 via an assembly bolt 52 that penetrates and a bush 80 fits in the outer periphery of the assembly bolt 52 to thereby reduce operating noise.

Further, the front ends of the left torsion bar 10 and the right torsion bar 20 are also coupled to the other end of the connection link 40 via the bush 80 to thereby reduce the operating noise.

A suspension pin 54 on which the hook 64 is suspended detachably may be installed on a free end of the cab mounting bracket 50.

Figure 7:
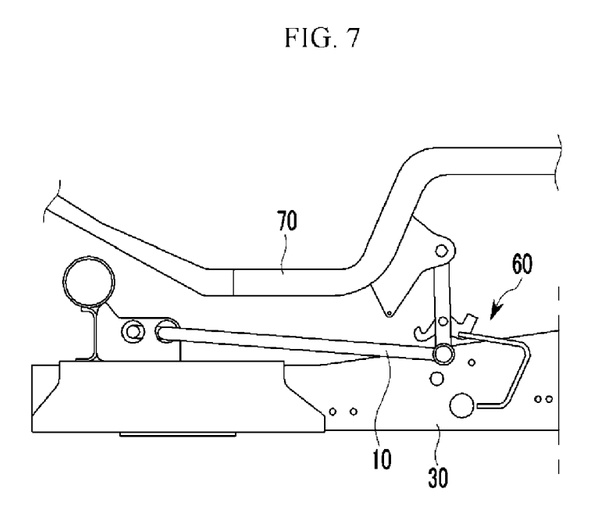
FIG. 7 is a side view before an exemplary cab tilting device is operated according to the present invention.

Referring to FIG. 7, when the cab 70 is fixed to the vehicle body via a locking device (not illustrated), the left torsion bar 10 and the right torsion bar 20 are twisted by a load of the cab 70 to store the twisting restoring force.

When a worker releases the locking device to tilt the cab 70 toward the front of the vehicle, for example, in order to maintain an engine while each of the torsion bars 10 and 20 stores the twisting restoring force as such, the cab 70 is tilted with being lifted up toward the front of the vehicle at a predetermined angle by the twisting restoring force of each of the torsion bars 10 and 20

Figure 8:
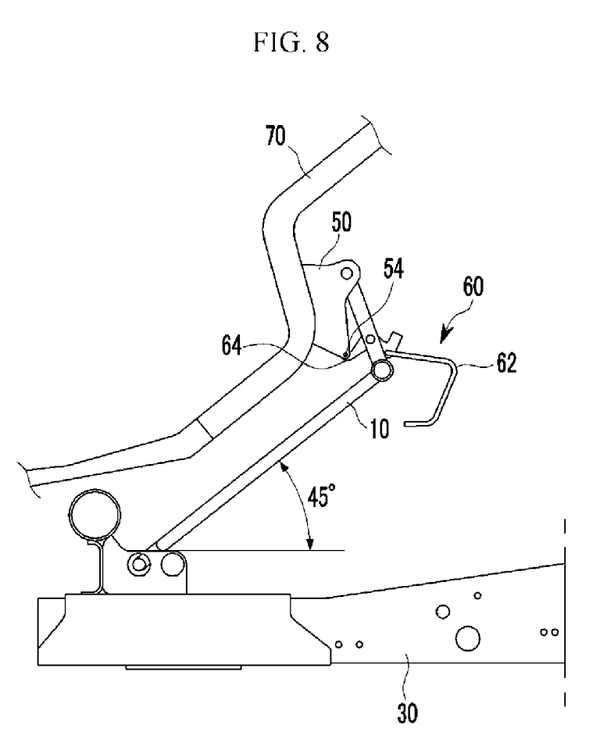
FIG. 8 is a side view of a state in which a cab is stayed by the exemplary stay while the cab is tilted toward the front of a vehicle by the cab tilting device according to the present invention.

When the worker pushes up the cab 70 in order to additionally tilt the cab 70 while the cab 70 is tilted by the torsion bars 10 and 20, for example, when the worker tilts the cab 70 toward the front of the vehicle up to approximately 45° as illustrated in FIG. 8, the hook 64 of the stay 60 is automatically suspended on the suspension pin 54 of the cab mounting bracket 50 and the cab 70, and the torsion bars 10 and 20 are integrated with each other to thereby stay the cab 70.

When the worker rotates the operating handle 66 of the stay 60 by gripping the operating handle 66 counterclockwise with his/her hand in order to cancel the stay state of the cab 70, the hook 64 is released from the suspension pin 54, and as a result, the stay state of the cab 70 is cancelled.

For convenience in explanation and accurate definition in the appended claims, the terms upper or lower, front or rear, left or right, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cab tilting device, comprising:
   a left torsion bar connected with a left bottom of a cab; and
   a right torsion bar connected with a right bottom of the cab, wherein:
   the left torsion bar and the right torsion bar in the longitudinal direction thereof are rotatable supported on a vehicle body, and each first end of the left torsion bar and the right torsion bar is fixedly mounted on the vehicle body and each second end thereof is connected to the cab, the left torsion bar configured to generate twisting restoring force to tilt the cab toward a front of a vehicle from the left bottom of the cab in a width direction of the cab in accordance with a rotation of the left torsion bar and the right torsion bar configured to generate the twisting restoring force to tilt the cab toward the front of the vehicle from the right bottom of the cab in the width direction of the cab in accordance with a rotation of the right torsion bar,
   a left vehicle body mounting bracket and a right vehicle body mounting bracket are mounted on the left and right sides of the vehicle body in the width direction of the vehicle, respectively,
   the left torsion bar is configured to fit through the left vehicle body mounting bracket to be supported and is fixedly mounted on the right vehicle body mounting bracket, and
   the right torsion bar is configured to fit through the right vehicle body mounting bracket to be supported and is fixedly mounted on the left vehicle body mounting bracket, a bush through which the left torsion bar fits to be supported and a fixing bracket coupled with the right torsion bar are each mounted on the left vehicle body mounting bracket, and a bush through which the right torsion bar fits to be supported and a fixing bracket coupled with the left torsion bar are each mounted on the right vehicle body mounting bracket, wherein the fixing bracket includes:
quadrangular coupling holes in which front ends of the left torsion bar and the right torsion bar are configured to fit, and mounting holes configure for mounting the left torsion bar and the right torsion bar on the vehicle body mounting bracket, and, the front ends of the left torsion bar and the right torsion bar are formed in a quadrangular coupling projection shape to correspond to a quadrangular shape of the coupling hole.

2. The cab tilting device of claim 1, wherein:
the left torsion bar and the right torsion bar extend in the width direction of the cab.

3. The cab tilting device of claim 2, wherein:
first portions of the left torsion bar and the right torsion bar are aligned to cross each other in the width direction and a height direction of the cab.

4. The cab tilting device of claim 1, wherein:
each of the left torsion bar and the right torsion bar is formed in an 'L' shape.

5. The cab tilting device of claim 4, wherein:
each of the left torsion bar and the right torsion bar includes:

a first bend bent in the longitudinal direction of the each of the left torsion bar and the right torsion bar at a predetermined angle, a torsion part that extends in the width direction of the vehicle based on the first bend, and an arm part that extends in the longitudinal direction of the vehicle based on the first bend connected to the cab wherein the torsion part is configured to generate twisting restoring force according to rotation of the arm.

6. The cab tilting device of claim 5, wherein:
each of the left torsion bar and the right torsion bar includes a first end fixed to the vehicle body, and a second end connected to the cab, and a second bend is formed at a torsion part of each of the left torsion bar and the right torsion bar so that the first end makes an acute angle with the first bend toward the front of the vehicle.

7. The cab tilting device of claim 6, wherein:
the second bend is bent upward in the height direction of the vehicle so that the left torsion bar has a 3D shape, and the second bend is bent downward in the height direction of the vehicle so that the right torsion bar also has the 3D shape.

8. The cab tilting device of claim 6, wherein:
the second end of each of the left torsion bar and the right torsion bar is connected to a first end of a connection link, a cab mounting bracket is fixedly mounted on the cab, a second end of the connection link is connected to the cab mounting bracket, and a stay for suspending and fixing the cab mounting bracket is installed in the connection link.

9. The cab tilting device of claim 8, wherein:
a suspension pin is installed in the cab mounting bracket, and the stay includes a hook which is detachably coupled to the suspension pin and an operating handle integrally connected to the hook in order to rotate the hook so that the hook is separated from the suspension pin.

10. The cab tilting device of claim 8, wherein:
the bush is installed at a spot where the cab mounting bracket and the connection link are connected to each other.

11. The cab tilting device of claim 8, wherein:
the bush is installed at a connection spot between each of the left torsion bar and the right torsion bar, and the connection link.

* * * * *